Feb. 26, 1946.　　　J. T. KING　　　2,395,745
JOINT AND CLAMP CONSTRUCTION
Filed Nov. 16, 1942
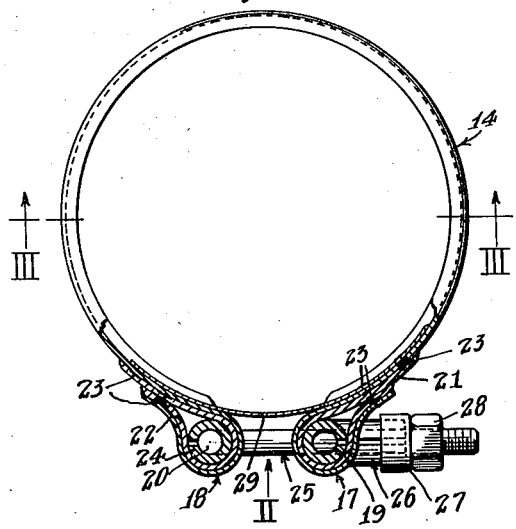
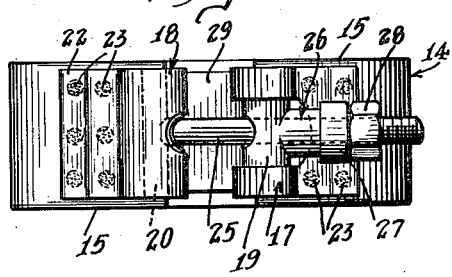
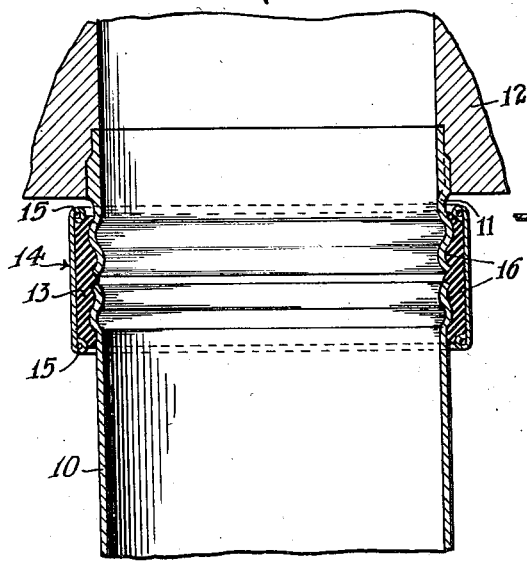
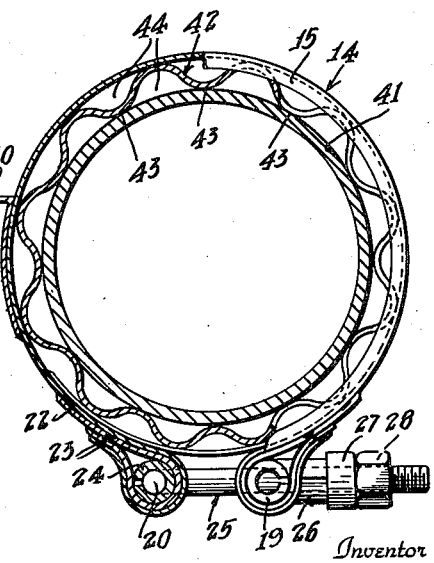
Inventor
James T. King
By Lyon & Lyon
Attorneys Patented Feb. 26, 1946

2,395,745

UNITED STATES PATENT OFFICE 2,395,745

JOINT AND CLAMP CONSTRUCTION

James T. King, Burbank, Calif.

Application November 16, 1942, Serial No. 465,682

4 Claims. (Cl. 285—129)

This invention relates to band structures for forming connections between pipes and for supporting pipes and has as a broad object to provide lightweight, inexpensive and efficient structures for such purposes.

A more specific object is to provide a joint structure for relatively large pipes that is very easily and quickly assembled and disassembled, remains fluid tight in service and provides some cushioning between the pipes.

Another object is to provide a joint structure for large pipe members that does not require the use of large or special wrenches.

Another object is to provide a simple and serviceable hanger for supporting highly heated pipes, such as airplane engine exhaust systems.

Another object is to provide a single band clamp and sealing structure that is suitable both for forming joints between pipes and for forming hangers to support pipes.

Still another object is to provide a particularly light, strong and effective band clamp structure.

Briefly, a pipe coupling in accordance with the invention is effected by providing the pipes to be coupled with circumferential beading adjacent their ends, placing them in abutting relation, encircling the abutting end portions with a band of resilient compressible material such as rubber, and compressing the rubber band radially against the pipes with an adjustable band clamp having inwardly extending flanges or beads at its edges. The edge flanges are positioned axially beyond the ridges on the pipes and they compress or constrict the rubber band relatively tightly so as to prevent the axial separation of the pipes from each other or from the bands.

The same band clamp structure is employed in a hanger for hot pipes by attaching a supporting bracket to the clamp and placing the clamp around the pipe to be supported, with a corrugated filler strip inserted between the pipe and the clamp to effect radial separation therebetween, the corrugated filler strip being retained in position by the flanges on the clamp. The corrugated strip supports the pipe without producing hot spots thereon because cooling air can flow freely between the pipe and the band clamp through the interstices of the filler strip. The air flowing past the pipe carries heat directly away therefrom and it also carries heat rapidly away from the corrugated filler strip itself, thereby maintaining the latter at a relatively low temperature and enabling it to conduct heat away from the pipe at the points of contact between the pipe and the filler strip. The life of an engine exhaust duct of stainless steel is much greater when supported by my clamp hanger as described than when supported by a conventional support fitting for the reason that the conventional clamp prevents free radiation and conduction of heat from the portion of the pipe that it surrounds and that portion of the pipe deteriorates from corrosion much faster than do the remaining portions of the pipe. This corrosion is accelerated by mechanical wear resulting from relative contraction and expansion between the band and the pipe when a clamp is placed directly about a pipe.

A complete understanding of the invention may be had from the following detailed description, which refers to the drawing.

In the drawing:

Fig. 1 is an end view, partly in section, of an intake pipe joint clamp in accordance with my invention;

Fig. 2 is a side view of the clamp employed in the joint of Figure 3, the view being taken in the direction of the arrow II in Figure 1;

Fig. 3 is a longitudinal section through the joint, taken substantially in the plane III—III of Figure 1 and showing the clamp in use; and Fig. 4 is a cross section of a pipe retaining hanger or support in accordance with the invention.

Referring first to Fig. 3, there is disclosed a joint structure for interconnecting a pair of pipe members which in this instance consist of the intake pipe 10 of an internal combustion engine and a short pipe section 11 extending from the cylinder 12 of the engine. The pipe section 11 may be attached to the block 12 in any desired manner, the present invention relating only to the connection or joint between the pipe 11 and the pipe 10.

The essential elements of the joint are a band 13 of some resilient compressible material such as rubber and a band clamp 14 which surrounds the band 13 and compresses it radially against the pipes 10 and 11.

To lock the sealing band 13 and the band clamp 14 against axial displacement with respect to each other, the band clamp is provided with inwardly extending flanges at its edges. These flanges preferably consist of beads 15 formed by rolling the edges of the band clamp. The beads provide smooth rounded surfaces instead of sharp cutting edges, and materially stiffen the band, which is desirable.

The abutting ends of the pipes 11 and 10 are preferably slightly spaced from each other, as shown in Fig. 3, to prevent direct metal to metal contact and permit a limited amount of free movement or flexibility between the pipes. In order to retain the pipes against relative longitudinal displacement, it is highly desirable to form annular or circumferential ridges 16 on the joining pipe sections. These may be formed by simply corrugating the material as shown in Fig. 3 to index with complementary surfaces on the rubber band. It will be observed that both the ridges 16 are positioned axially between the beads of the band clamp and that each ridge is positioned quite close to one bead of the band clamp so that, when the latter is tightened, it compresses the rubber band 13 tightly against the outer portion of each ridge 16 to firmly lock the pipe against axial separating movement away from the pipe 11.

The rubber band 13 will also be compressed to a slight extent between the separated ends of the pipes so that those ends are positively maintained separated by the rubber therebetween.

The construction of the band clamp 14 is illustrated in Figs. 1 and 2. The opposite ends of the clamp are bent back upon themselves to form eyes 17 and 18 for the reception of cross elements 19 and 20, respectively, of a T bolt locking structure. The eyes are preferably reinforced by thicker strips 21 and 22, which are folded back with the band material exterior thereof and secured by spot welds 23. I also find it desirable to employ a split bushing sleeve 24 between the cross member 20 and the associated eye 18, this bushing serving to distribute the strain applied by the member 20 to the eye of the band and reduce the frictional resistance to rotation between the member 20 and the eye.

The cross member 20 forms an element of a one piece T bolt 25 which passes through a hollow T member 26 having the cross element 19 previously referred to. The stem of the member 26 is provided with a cap 27 on its outer end against which a nut 28 bears, this nut being screwed onto the threaded outer end of the T bolt 25. The eye 18 and its associated reinforcement 22 and bushing 24 are slotted to permit passage of the shank of the T bolt 25. Likewise the eye 17 and its reinforcement 21 are slotted to permit passage therethrough of the shanks of both the T bolt 25 and of the T member 26. Obviously by tightening the nut 28 the eyes at the opposite ends of the clamp may be drawn together to contract the clamp and constrict it about the rubber band 13. By virtue of the fact that the eyes of the band are free to pivot on the cross members 20 and 19, the band can readily conform to the surface area against which it is constricted. The throat of the band between the eyes 17 and 18 may be closed by a tongue 29, which is of such width as to fit between the beads 15 at the edges of the band clamp. It is preferably attached to the T bolt end of the band clamp as by spot welding.

It will be observed from Fig. 1 that the beaded edges of the band clamp extend substantially to the eyes 17 and 18 so that they cooperate with the rubber band 13 substantially throughout the full circumference of the latter.

A particular advantage of the joint and seal structure described is that it may be very rapidly assembled and disassembled with no other tool than a small wrench fitting the nut 28. For example, the pipe 10 is simply placed in position close to the end of the pipe 11, the rubber band 13 is slipped into place and then the band clamp is placed. The rubber band 13 itself often engages the pipes with sufficient tension to retain them in position while the band clamp is being installed.

In the hanger construction shown in Fig. 4, the same band clamp already described is employed except that it is provided with a bracket 40 secured to its exterior surface at any convenient point by welding, the bracket being dimensioned and shaped to meet the requirements of a particular installation. In Fig. 4 the clamp 14 is shown positioned about a pipe 41 in radially spaced relation thereto, with the corrugated metallic filler strip 42 inserted between the pipe and clamp. The filler strip is slightly narrower than the band so that it fits between the rolled beads 15 thereof and is retained in position by the beads. Aside from its contact with the beads 15, the filler strip 42 contacts the clamp and the pipe only at small areas so that air is free to circulate through the filter strip, past the pipe, and conduct heat therefrom. Any heat transferred from the pipe to the corrugated strip at the points of contact 43 therebetween is rapidly dispersed from the strip into the air which is free to flow through the spaces 44. As a result of this transfer of heat, first from the pipe to the strip 42 at the points of contact 43 and then from the strip to the air, the pipe may remain as cool or cooler at the contact points 43 as at the portions not contacted by the corrugated strip.

The structure shown in Fig. 4, therefore, has all the advantages of brackets adapted to be secured to heated pipes by clamping thereabout without having the usual disadvantage of producing exceptional and residual heating of the pipe at the points of contact therewith.

Although for the purpose of explaining the invention certain specific embodiments thereof have been described and shown in detail, various modifications can be made in the particular structure shown without departing from the invention, which is to be limited only to the extent set forth in the appended claims.

I claim:

1. A band clamp comprising: a strap having its opposite ends looped back to form eye means at each end of the strap, a T bolt having a cross member and a shank, said cross member being positioned within one of said eyes, trunnion means within the other of said eyes, the shank of said T member extending through said trunnion member, and means for adjustably engaging the shank of said T bolt and said trunnion member to tighten said strap, said strap being apertured at said eyes to permit passage of the shank of said T bolt, and a split sleeve interposed between said cross member of said T bolt and said one eye, said split sleeve being apertured opposite the split therein for the passage therethrough of the shank of said T bolt.

2. In a band clamp as set forth in claim 1, reinforcing straps of the same width as said main strap extending between the folded portions of the main strap and forming bearing elements for the cross member and the trunnion means.

3. A pipe coupling comprising; a pair of rigid pipe elements having their adjacent ends corrugated and spaced apart; a collar of resilient material surrounding said pipe elements and covering said corrugations; a flexible flat metallic band embracing said collar and provided with means for connecting the ends of the band together and for constricting the band around the collar, said metallic band having inwardly curled edges and said collar fitting the band and confined by said edges; said collar being of sufficient thickness to space said inwardly curled edges from the pipe elements when said band has been tightened.

4. A pipe support comprising; a bracket; a flexible metallic band secured to said bracket and having its longitudinal edges curled inwardly to constitute beads; said band being adapted to encircle a pipe; a transversely corrugated strip held within the band and confined there by said beads; and means to constrict said band and said strip about a pipe for the purposes described.

JAMES T. KING.